UNITED STATES PATENT OFFICE

2,504,049

PREPARATION OF POLYMETHACRYLIC ACID AND OF POLYMERIC PRODUCTS CONTAINING POLYMETHACRYLIC ACID

Lawrence M. Richards, Wilmington, Del., assignor to E. I. du Pont de Nemours & Company, Wilmington, Del., a corporation of Delaware No Drawing. Application March 4, 1946, Serial No. 651,969

4 Claims. (Cl. 260—80)

This invention relates to polymeric products. More particularly this invention relates to polymethacrylic acid and to a new process for its preparation and for the preparation of polymeric products containing polymethacrylic acid.

It is known that the polyacrylic esters can be hydrolyzed in the presence of alkali with relative ease to polyacrylic acid. However, under these conditions the polymeric methacrylates are extremely stable to hydrolysis (Gilman's Organic Chemistry, 2d edition, 1943, John Wiley & Sons, Inc., N. Y., vol. I, p. 752) and no successful method for their conversion to polymethacrylic acid has heretofore been devised.

It is an object of this invention to prepare polymethacrylic acid and polymeric products containing polymethacrylic acid. Another object is to provide polymethacrylic acid of high purity and in granular form. A further object is to provide a new process for the preparation of polymethacrylic acid. Still another object is to provide an economical process for the conversion, either partial or complete, of the ester groups of the polymethacrylates to carboxyl groups. Other objects will appear hereinafter.

These objects are accomplished by dissolving a polymethacrylate in an excess of concentrated sulfuric acid, aging the resulting acid solution for a suitable period of time at a temperature of 0 to 100° C., and isolating the polymeric products so obtained.

The invention is further illustrated by the following examples in which parts are given in weight unless otherwise indicated.

Example I

A solution of 20 parts of polymethyl methacrylate in 176 parts of benzene was poured slowly into 367 parts of concentrated sulfuric acid (95.5%) with stirring while maintaining the temperature below 45° C. The two phases were separated 15 minutes after mixing and the acid phase was stored in an oven at 45° C. for 20 hours. This aged solution was poured onto cracked ice whereupon a polymer precipitated. This polymer was thoroughly washed in distilled water and found to be alkali-soluble. Analysis proved this material to be polymethacrylic acid.

Example II

Granular polymethyl methacrylate (30 parts) was dissolved in 367 parts of concentrated sulfuric acid (95.5%) and the resulting acid solution was aged at 45° C. for 17 hours. The polymer was then isolated by pouring a thin stream of the acid solution onto ice and purified by thoroughly washing with distilled water. By this procedure 22 parts of the dry polymethacrylic acid was obtained.

The polymethacrylic acid prepared by the process of this invention is differentiated from certain polymethacrylic acids of other processes in the stability of aqueous solutions of its salts. For example, a five percent aqueous alkaline solution from polymethacrylic acid prepared in accordance with the above procedure of this example showed no appreciable change in viscosity over a period of 1½ months at 25° C. whereas certain commercial preparations of polymethacrylic acid, under the same treatment, undergo rapid viscosity changes.

Example III

Fifty (50) parts of commercial polymethyl methacrylate granules were dissolved in 458.5 parts of 95.5% sulfuric acid during a period of one hour while maintaining the temperature below 35° C. This solution was divided into several portions and each portion was allowed to age for a specific time and at a specific temperature before isolation of the polymethacrylic acid which was accomplished by pouring a thin stream of the acid-polymer solution into cold water, washing the precipitated polymers with distilled water, drying, and determining the percent hydrolysis to polymethacrylic acid by carbon and hydrogen analysis. The results are tabulated below:

| Time, Hrs. | Percent Hydrolysis | | | Viscosity of 5% Solution, Poises | |
|---|---|---|---|---|---|
| | 25° C. | 45° C. | 75° C. | 45° C. | 75° C. |
| 1 | | 67 | 100 | 31 | 1.3 |
| 3 | 48 | 74 | 100 | 16 | 0.85 |
| 6 | 52 | 100 | 100 | 1.3 | 0.7 |

These results show that this process may be controlled to give partial or complete hydrolysis of polymethacrylates in relatively short periods of time in an economic fashion. The process is especially useful for 50 to 100% hydrolysis of the polymethacrylates.

Although the invention has been illustrated with polymethyl methacrylate, other polymethacrylic esters may be employed such as the ethyl, n-propyl, n-butyl, isobutyl, n-amyl, n-hexyl, octyl, dodecyl, cyclohexyl, octadecyl, beta-ethoxyethyl, and benzyl esters. Mixtures of these polymethacrylic esters may also be employed.

The temperatures at which aging is carried out should be below the point at which decomposition takes place. Satisfactory operating temperatures which may be employed are within the range of 0° C. to 100° C. with 25–75° C. as the preferable temperature range. The temperatures selected will, of course, depend to a large extent on the concentration of acid used, the ratio of acid to polymethacrylate, the time of aging, and the amount of conversion of ester to carboxyl groups, partial or complete, which is desired. In general, it is preferable to select conditions which will not require extended periods of time for attaining the desired results.

The strength of sulfuric acid which may be employed should be in excess of 80% concentration and preferably of 90 to 100% concentration. Concentrations of sulfuric acid below 90% although operable, do not as a rule effect hydrolysis in reasonable lengths of time.

The ratio of polymethacrylate to concentrated sulfuric acid which may be used may vary from 1:99 to 2:3 with the preferred range between 1:9 to 1:4. Thus the amount of concentrated sulfuric acid should be in excess of the polymethacrylate.

While it is preferred to operate the process in the absence of a solvent, the use of solvents is not precluded. In fact, organic solvents such as benzene and other aromatic hydrocarbons, and alkyl halides, e. g., butyl bromide, in which the polymethacrylate employed is satisfactorily soluble and which solvents are relatively stable to the effect of the concentrated sulfuric acid under the conditions of the process, are included within the scope of this invention.

The polymethacrylic acid and partially hydrolyzed polymethacrylates of this invention are suitable for use as granulating agents, tanning agents, and the like.

As many apparently widely different embodiments of this invention may be made without departing from the spirit and scope thereof, it is to be understood that I do not limit myself to the specific embodiments thereof except as defined in the appended claims.

I claim:

1. A process for the preparation of polymethacrylic acid which comprises dissolving an ester of polymethacrylic acid in an excess of sulfuric acid of 90 to 100% concentration, aging the resulting acid solution of said ester for a period of at least one hour at a temperature of 25° to 100° C., then diluting the aged acid solution with water and isolating therefrom the polymethacrylic acid so obtained.

2. A process for the preparation of polymethacrylic acid which comprises dissolving an ester of polymethacrylic acid in an excess of sulfuric acid of 90 to 100% concentration, aging the resulting acid solution of said ester for a period of at least one hour at a temperature of 45° to 100° C., then diluting the aged acid solution with water and isolating therefrom the polymethacrylic acid so obtained.

3. A process for the preparation of polymethacrylic acid which comprises dissolving polymethyl methacrylate in an excess of sulfuric acid of 90 to 100% concentration, aging the resulting acid solution of said polymethyl methacrylate for a period of at least one hour at a temperature of 45° to 100° C., then diluting the aged acid solution with water and isolating the polymethacrylic acid so obtained.

4. A process for the preparation of polymethacrylic acid which comprises dissolving polymethyl methacrylate in an excess of sulfuric acid of 95.5% concentration, aging the resulting acid solution of said polymethyl methacrylate for a period of at least one hour at a temperature of 45° to 100° C., then diluting the aged acid solution with water and isolating the polymethacrylic acid so obtained.

LAWRENCE M. RICHARDS.

REFERENCES CITED

The following references are of record in the file of this patent:

UNITED STATES PATENTS

| Number | Name | Date |
|---|---|---|
| 2,205,883 | Graves | June 25, 1940 |

OTHER REFERENCES

Du Pont, Lucite Manual, published by E. I. du Pont de Nemours and Co., Inc. (1942), page 117.

Huntress, "Problems in Organic Chemistry," pages 55 and 56, first edition pub. 1938 by McGraw-Hill Book Co., N. Y.

Clarke, "A Handbook of Organic Analysis," page 14, 2nd edition pub. 1916 by Longmans, Green and Co., New York.

Delmonte, ASTM Bulletin, Dec. 1942, pages 11 and 12.